(12) United States Patent
Gulati et al.

(10) Patent No.: US 8,170,326 B2
(45) Date of Patent: May 1, 2012

(54) MULTI PARALLAX EXPLOITATION FOR OMNI-DIRECTIONAL IMAGING ELECTRONIC EYE

(75) Inventors: Sandeep Gulati, La Canada, CA (US); Thomas George, La Canada, CA (US)

(73) Assignee: ViaLogy Corp., Altadena, CA (US)

( * ) Notice: Subject to any disclaimer, the term of this patent is extended or adjusted under 35 U.S.C. 154(b) by 1155 days.

(21) Appl. No.: 11/969,203

(22) Filed: Jan. 3, 2008

(65) Prior Publication Data

US 2009/0232387 A1    Sep. 17, 2009

Related U.S. Application Data

(60) Provisional application No. 60/883,286, filed on Jan. 3, 2007.

(51) Int. Cl.
*G06K 9/46* (2006.01)
*H04N 13/00* (2006.01)

(52) U.S. Cl. ............. 382/154; 382/190; 348/42; 348/47

(58) Field of Classification Search .................. 382/154, 382/181, 190, 195, 199, 200, 318; 348/42, 348/47, E13.001, E13.002, E13.003, E13.025, 348/E13.004, 568, E5.112

See application file for complete search history.

(56) References Cited

U.S. PATENT DOCUMENTS

| | | | |
|---|---|---|---|
| 6,507,665 B1 * | 1/2003 | Cahill et al. | 382/154 |
| 6,754,378 B2 * | 6/2004 | Ito et al. | 382/154 |
| 7,085,435 B2 * | 8/2006 | Takiguchi et al. | 382/294 |
| 7,193,626 B2 * | 3/2007 | Otani et al. | 345/418 |
| 7,324,670 B2 * | 1/2008 | Kozakaya et al. | 382/118 |
| 7,386,226 B2 * | 6/2008 | Miyoshi et al. | 396/89 |

FOREIGN PATENT DOCUMENTS

| | | |
|---|---|---|
| JP | 10-188146 | 7/1998 |
| JP | 2002-027446 | 1/2002 |
| KR | 10-0590254 | 10/2000 |
| WO | WO 99/51027 | 10/1999 |

* cited by examiner

*Primary Examiner* — Sheela Chawan
(74) *Attorney, Agent, or Firm* — Fish & Richardson P.C.

(57) ABSTRACT

Techniques and systems are disclosed for electronic target recognition. In particular, techniques and systems are disclosed for performing electronic surveillance and target recognition using a multiple parallax exploitation (MPEX) electronic eye platform. Among other things, a MPEX system can include an imaging unit that includes multiple image capture devices spaced from one another to form an array to provide overlapping fields-of-view and to capture multiple overlapping stereo images of a scene. The MPEX system can also include a processing unit connected to the imaging unit to receive and process data representing the captured multiple overlapping stereo images from the imaging unit to characterize one or more objects of interest in the scene.

20 Claims, 11 Drawing Sheets

MULTI PARALLAX EXPLOITATION FOR OMNI-DIRECTIONAL IMAGING ELECTRONIC EYE

CLAIM OF PRIORITY

This application claims priority under 35 USC §119(e) to U.S. Patent Application Ser. No. 60/883,286, filed on Jan. 3, 2007, the entire contents of which are hereby incorporated by reference.

TECHNICAL FIELD

This application relates to object detection and electronic target recognition.

BACKGROUND

Automatic target recognition (ATR) in artificial systems can involve complex computational models and data processing. To perform ATR, artificial systems have been modeled after the human brain. However, computational models based on neurobiology and physiology of human brain may not be suitable for performing certain ill-defined tasks such as pattern recognition, sensor fusion, fault-tolerance control, adaptation to environment, etc.

SUMMARY

Techniques and systems are disclosed for electronic target recognition. In particular, techniques and systems are disclosed for performing electronic surveillance and target recognition using a multiple parallax exploitation (MPEX) electronic eye platform.

In one aspect, a MPEX system can include an imaging unit that includes multiple image capture devices spaced from one another to form an array to provide overlapping fields-of-view and to capture multiple overlapping stereo images of a scene. The MPEX system can also include a processing unit connected to the imaging unit to receive and process data representing the captured multiple overlapping stereo images from the imaging unit to characterize one or more objects of interest in the scene.

Implementations can optionally include one or more of the following features. The imaging unit can be designed to capture images of each object of interest in multiple orthogonal frames. The processing unit can be designed to process the data by processing overlapping regions in the overlapping stereo images. Also, the processing unit can be designed to process the data on object of interest basis instead of pixel basis. Further, the processing unit can be designed to correlate the overlapping stereo images in a position-shift-rotation invariant manner. The position-shift-rotation invariant manner used can be clutter resistant. In addition, the imaging unit can include a combination of low and high resolution image capture devices. Alternatively, the imaging unit can include multiple image capture devices having different focal lengths.

In another aspect, a method for implementing a MPEX system includes capturing images of a scene in one or more overlapping fields of view. Overlapping regions of the captured images are processed, and based on the processing, one or more objects of interest in the scene are characterized.

Implementations can optionally include one or more of the following features. Capturing the images can include capturing images of the one or more objects of interest in multiple orthogonal frames. Also, subgraph-isomorphic correlation can be performed with the captured images. The captured images can be processed on object of interest basis instead of pixel basis. In addition, correlation of the captured images can be performed in a position-shift-rotation invariant manner. The performed correlation of the captured images in a position-shift-rotation invariant manner can be clutter resistant.

In another aspect, a computer program product, embodied on a computer-readable medium, can be operable to cause a data processing apparatus to perform various operations. For example, the computer program product can cause a data processing apparatus to capture images of a scene in one or more overlapping fields of view. The computer program product can cause a data processing apparatus to process overlapping regions of the captured images. Also, based on the processing, the computer program product can cause a data processing apparatus to characterize one or more objects of interest in the scene.

Implementations can optionally include one or more of the following features. The computer program product can be further operable to cause a data processing apparatus to capture the images comprises images of the one or more objects of interest in multiple orthogonal frames. The computer program product can be further operable to cause a data processing apparatus to perform subgraph-isomorphic correlation with the captured images. The computer program product of can be further operable to cause a data processing apparatus to process the captured images on object of interest basis instead of pixel basis. The computer program product can be further operable to cause a data processing apparatus to perform correlation of the captured images in a position-shift-rotation invariant manner. The computer program product can be further operable to cause a data processing apparatus to perform correlation of the captured images in a position-shift-rotation invariant manner that is clutter resistant.

Techniques and systems according to the present specification can be implemented to potentially provide various advantages. For example, MPEX can be implemented to mimic biological systems such as the visual system of the jumping spider by incorporating multiple areas such as stereo vision, image processing, cognitive/biological visual perception, video analytics & depth ranging, etc. Also, MPEX can provide all-round real-time situational awareness, such as (1) target detection and tracking and (2) terrain, target and threat perception.

Further, MPEX can be computationally optimized. For example, significantly larger number of flat-field stereo eye pairs may be needed to get the similar coverage as MPEX. In addition, less mass, volume and power is needed for MPEX. Also, the amount of overlap in actual fields-of-view (FOV) can be optimized to an algorithm with full imaging resolution. Optimizing the overlap in actual FOV can improve on the arachnoids construct.

In addition, MPEX can enhance range and depth perceptions. Also, MPEX can simplify clutter removal in natural scenes using overlapping FOV. Further, MPEX can deliver pre-attentive vision and focal zooming in the same computational cycle.

The techniques and systems as described in this specification can be implemented to perform object extraction using quantum resonance interferometry (QRI) or other suitable imaging techniques. The techniques and systems can provide geometric representation for a desired target, terrain and/or threat can be generated. In addition, a high-density memory encoder and a memory correlator can be implemented.

Various QRI techniques are described in issued U.S. Pat. No. 6,963,806; U.S. Pat. No. 6,780,589; and U.S. Pat. No. 6,142,681, which are incorporated by reference in the present application. Briefly, QRI is utilized to amplify signals associated with the events of interest having an intensity lower than the intensity of signals associated with noise, to an intensity greater than the intensity of the signals associated with noise to generate a modified output pattern. Once the desired signals are amplified, the technique determines which signals within the modified output pattern correlate with events of interest thus permitting a determination to be made whether a certain event of interest has occurred.

Also, the techniques and systems as described in this specification can extract objects and features from real-time video imagery. In addition, techniques and systems as described in this specification can exploit advanced concepts from graph-theory and stochastic integral geometry previously deployed in battlefield intelligence and doctrinal templating analysis. Further, the techniques and systems as described in this specification can exploit phase space embedding used for encoding and searching thru very large starmap catalogs. In operations, a novel position-shift-rotation invariant (PSRI) affine transform for solving subgraph isomorphism is implemented. Also, the techniques and systems as described in this specification can be implemented using algorithmic building blocks and software components.

BRIEF DESCRIPTION OF THE DRAWINGS

Like reference symbols and designations in the various drawings indicate like elements.

DETAILED DESCRIPTION

Figure 1:
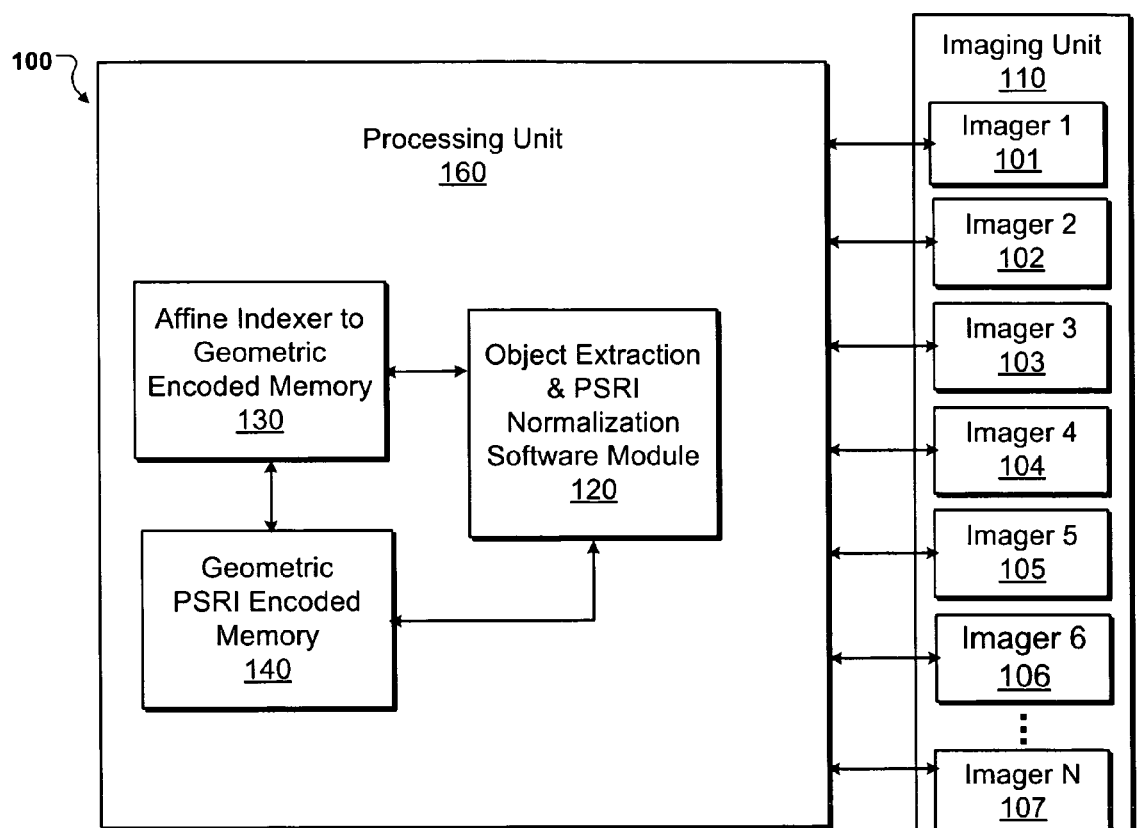
FIG. 1 is a block diagram of an example MPEX system

Techniques and systems are disclosed for electronic target recognition. In particular, techniques and systems are disclosed for performing electronic surveillance and target recognition using a multiple parallax exploitation (MPEX) electronic eye platform.

MPEX provides target acquisition and tracking performance enablement resulting from convergence of three key principles underlying biomimetic construction:
(a) Exploitation of multiple optical parallaxes for simultaneous multiple target tracking and precision ranging;
(b) Position, shift and rotation invariant (PSRI) ATR based on spatial correlations between acquired real-time acquired image scenes and encoded, reprogrammable template libraries of reference targets of interest; and
(c) Registration and adaptive referencing of dynamic target and MPEX Electronic Eye frame of reference.

MPEX is applicable to both static and mobile platforms and works for stationary and dynamic targets.

Biological systems can be apt at performing certain ill-defined tasks such as pattern recognition, sensor fusion, fault-tolerant control, adaptation to environment, etc. The mechanisms, and structures found in these biological systems can be artificially duplicated to build robust artificial systems that can perform these tasks efficiently. MPEX embodies the same architectures, functions, mechanisms, and/or principles of the visual perception underlying these biological systems to enhance silicon-based digital seekers and surveillance platforms.

For example, the cortical construction of certain reptiles and arachnids can be used to provide ultra-fast close proximity automatic target recognition (ATR). The operational and organizational principles of the reptiles' and arachnids' biomimetic machinery for complete visual processing can incorporate various components such as a well-integrated processor and a large random-access associative memory directly interfacing several sensors including eyes, nose, etc. Biomimetic is the application of biological methods and systems found in nature to study the design of engineering systems and modern technology. These biomimetic machineries of the reptiles and arachnids are capable of accomplishing multiple tasks from low (pixel) level sensor fusion to higher level cognition and creative problem solving.

Based on this biological information, models to compute elements, certain architectures for information processing, and novel algorithms based on biological counterparts can be implemented. For example, Artificial Neural Networks can use "accumulate and fire" effects and strengthening of connections at firing synapses as metaphors for simple non-linear perceptron models and Hebbian learning algorithms. In addition, neural modeling can be used to generate mathematical models of neuron and synapse structures as building blocks, learning and optimization algorithms, and silicon implementation of neural network structures.

Cellular Systems (Cellular Automata, Cellular Neural Networks) is another example of a biology based system that can provide a strong emphasis on local neighbor interaction, such as those used in the retina. In the arena of algorithms, evolutionary techniques represent another nature-inspired metaphor. Further, based on selective reproduction of the fittest individuals in a population, a series of adaptation (search/optimization) algorithms can be provided, such as genetic algorithms, genetic programming, evolutionary strategies, etc. that are effective in solving certain difficult real-world problems.

Also, sensors can be implemented to mimic architectures and basic functions of an animal retina, cochlea, nose, and skin. Further, biology-inspired cooperative and distributed sensing, adaptive sensor fusion, and variable focus of attention can be implemented.

Multiple parallax exploitation (MPEX) electronic eye is a next-generation seeker and surveillance platform based on biomimetic principles. The MPEX electronic eye can be implemented as a silicon electronic-eye with the underlying vernier hyper-acuity in bio-explorers such as insects and reptiles.

FIG. 1 is a block diagram of an example MPEX system 100. The MPEX system 100 includes an imaging unit 110 connected to a processing unit 160. The imaging unit 110 can include multiple imagers or image capture devices 101, 102, 103, 104, 105, 106, 107, etc. spaced from one another to form an array. These imagers can include low and/or high resolution analog or digital internet-protocol (IP) enabled cameras, thermal imagers, multispectral imagers, X-ray cameras, ultra-wideband intensifiers, microwave, and/or terahertz imagers. The imagers 101, 102, 103, 104, 105, 106, 107, etc. can be selected to have differing focal lengths and overlapping field of view. The processing unit 160 can include processing software architecture. For example, the processing unit 160 can include an affine indexer to geometric encoded memory 130, a object extraction & PSRI normalization software module 120. Further, the processing unit 160 can include a geometric PSRI encoded memory unit 140 for storing data. The imaging unit 110 can capture image data of a scene that includes one or more targets or objects of interest. The captured image data is sent to the processing unit 160 to be processed. The processing unit 160 performs automatic target recognition according to the techniques described in this specification.

In some implementations, the imaging unit 110 of the MPEX system 100 can include miniaturized hardware compound eye(s) comprising of multiple focal planes bonded together at different angles with identical or different focal lengths and overlapping fields of view. In addition, the imaging unit 110 can include low-power imagers for mobile applications. Further, the processing unit 160 can include a memory unit (e.g., gigabit or terabyte memory chip-sets) with optoelectronic correlators. This is for very fast real-time correlation of incoming video imagery with stored images of targets of interest. Incoming images can be compared with thousands of stored images in microseconds to milliseconds using optical correlators. The system architecture, software and technology can be modified as needed.

Figure 2:
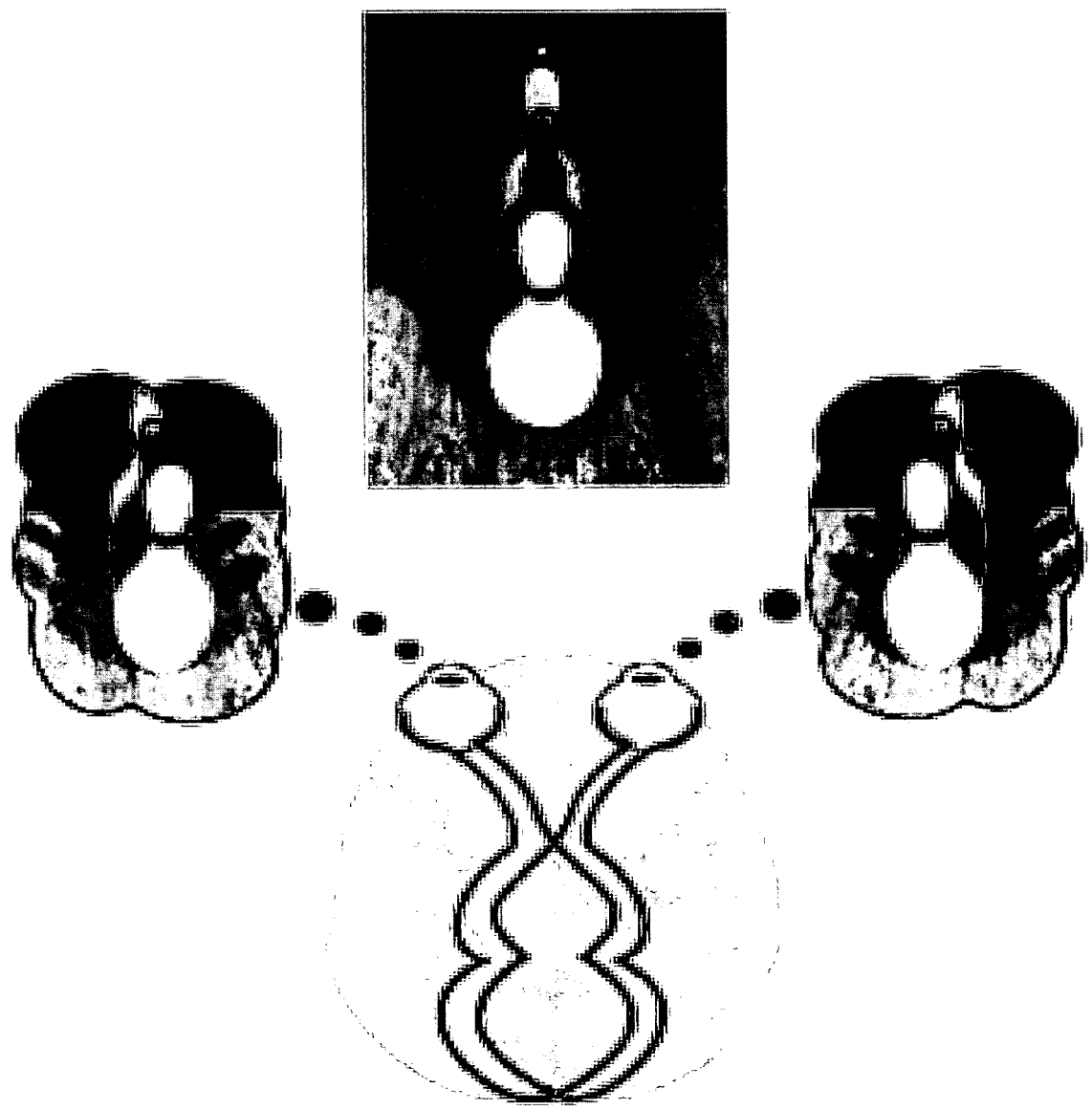
FIG. 2 is an illustration of stereo vision.
Figure 3:
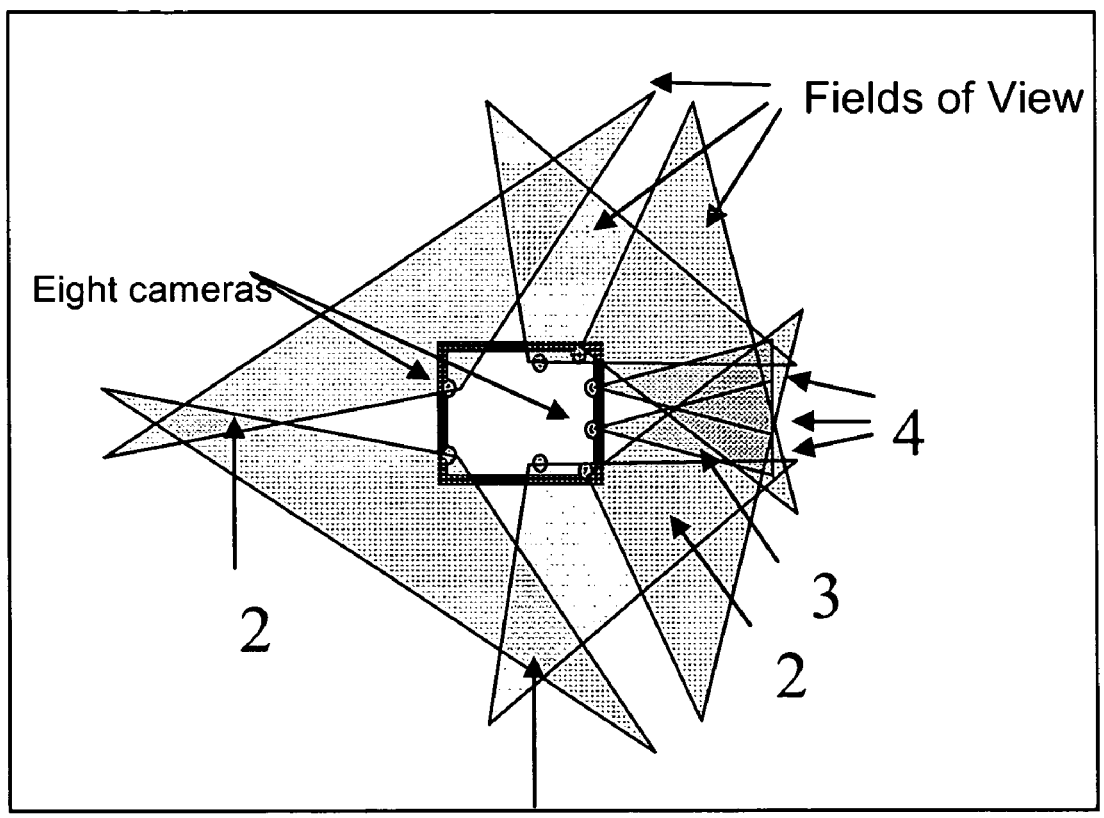
FIG. 3 is an illustration of multiple parallax vision.

Multiple parallax is different from stereo vision. Stereo vision represents the observed depth perception from binocular vision that requires co-registration of frames from two eyes as shown in FIG. 2. Multiple Parallax delivers panoramic or 360-degree awareness and 3-D perception using overlapping fields-of-view (OFOV) as shown in FIG. 3. OFOV can have varying resolution based on lens f-numbers, differential localization capability, etc.

Figure 4:
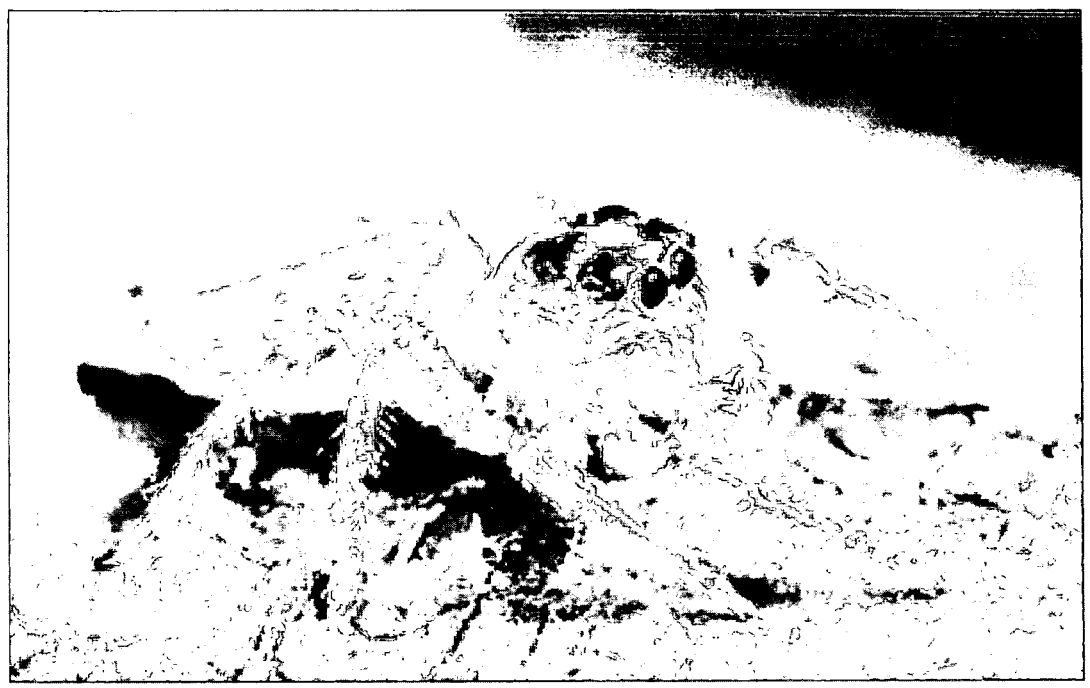
FIG. 4 is an illustration of a jumping spider.
Figure 5:
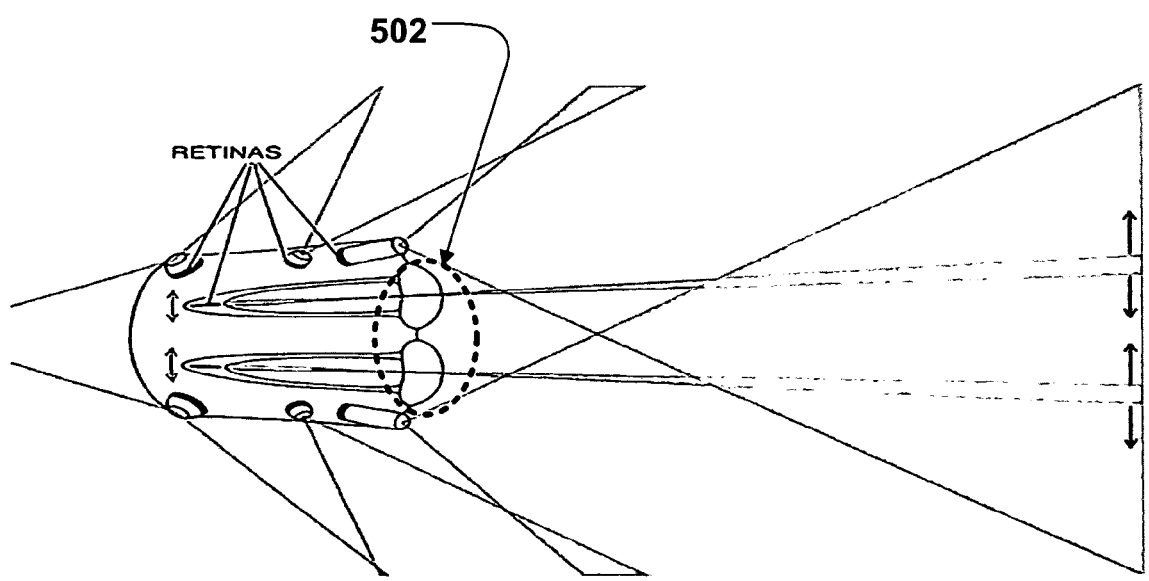
FIG. 5 is an illustration of an example visual system of a jumping spider.

An example biomimetic construct of multiple parallax can be illustrated for the jumping spider shown in FIG. 4. The jumping spider has 8 eyes providing 360-degree FOV. Multiple parallax results from the overlapping eyes and mix of lenses. FIG. 5 is an illustration of the visual system of the jumping spider. The two frontal eyes 502 with long focal lengths give precise depth ranging for the jumping spider. In addition, the jumping spider has coarse localization capability on the sides.

The visual system of the jumping spider is adapted for hunting "sparse" prey. The jumping spider waits and acquires prey present in some FOV. When the prey in the FOV is recognized, the jumping spider can rapidly estimate depth and motion of the recognized prey. The jumping spider can rotates its body as required to acquire the target prey and launch precise attacks on the target prey. The multiple parallax provides an all-around situational awareness capability that increases the probability of target acquisition in the jumping spider.

In some implementations, the multiple IP cameras of the imaging unit 110 are arranged in an arachnid eye configuration with overlapping FOV to mimic the jumping spider visual system. For example, eight IP cameras can be networked together with 6 of the IP cameras being low resolution and 2 being high resolution. The networked IP cameras can detect targets or objects of interest in complex natural urban scene with high clutter, background motion, wind, obstruction, lighting variation, etc. The complex natural urban scene can introduce various geometric targets or objects of interest in the FOV at unknown times and scene depth.

In some implementations, MPEX system 100 can be implemented using a modular architecture. The building blocks of the modular architecture can include one or more processing units, such as a parallax exploitation unit (PXU). Each PXU can interface with 2 or more imagers (e.g., IP cameras of varying resolution) with overlapping FOV. The building blocks of the modular structure can also include a framework for chaining multiple PXUs to form more sophisticated MPEX constructs.

Figure 6:
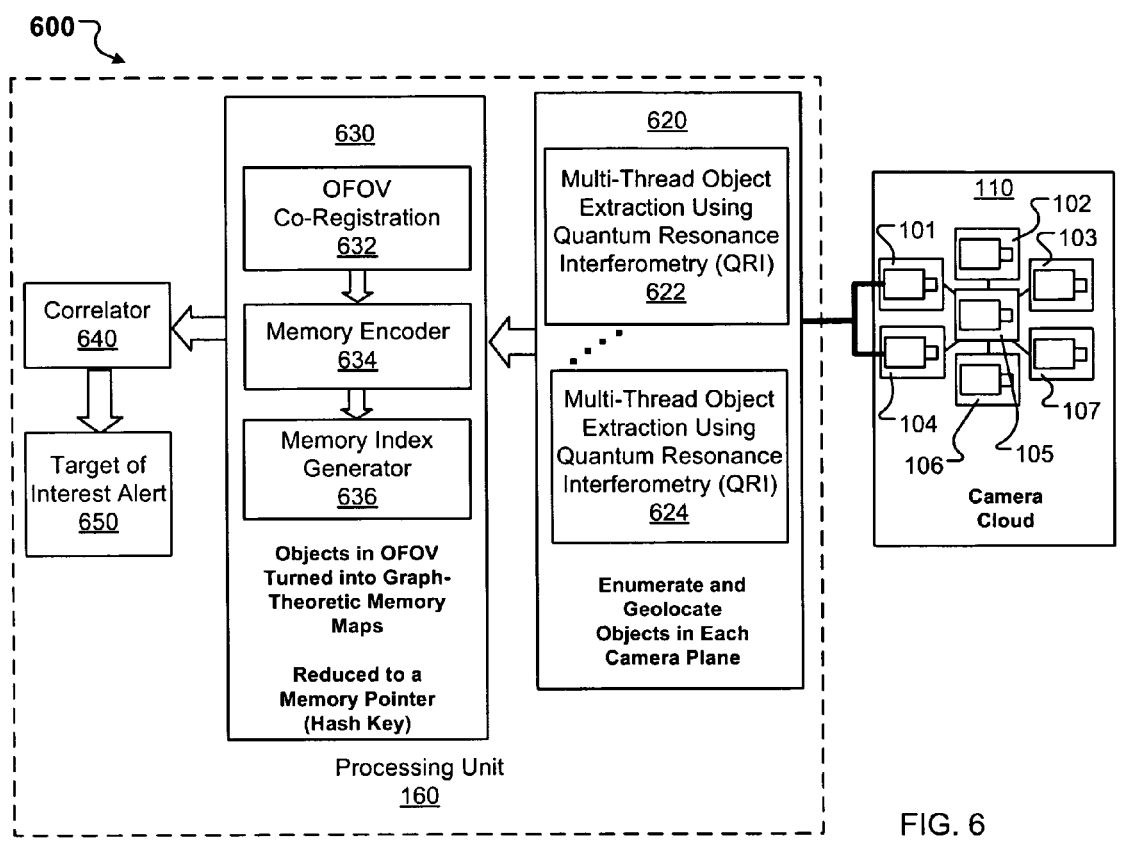
FIG. 6 is a block diagram illustrating an example modular architecture.

FIG. 6 is a block diagram illustrating an example modular architecture. The example modular architecture includes an imaging unit or a camera cloud 110 that includes multiple imagers or image capture devices 101, 102, 103, 104, 105, 106, 107, etc., such as IP cameras arranged to form an array. The imaging unit 110 is connected to one or more processing units 160, such as a PXU. When implemented as a PXU, each processing unit 160 includes an object extraction unit 620 connected to a data analyzer unit 630. Also, each PXU includes a correlator 640 connected to the data analyzer unit 630. The correlator 640 is connected to an output unit 650 to provide an indication (e.g., a visual or audio alert) of the recognized target or object of interest. The components with PXU 160 can be implemented in software or firmware.

The imaging unit 110, with overlapping fields of view can capture image data of a scene that includes one or more targets or objects of interest. Each imager, a pair, triad or quad with OFOV defines a parallax set. Together they form a multi-parallax cloud. Real-time target detection, recognition and tracking is achieved by interpreting "parallax blobs" or groups of object pixels in the focus field of two or more imagers. The captured image data is received and processed by the one or more PXUs 160. The object extractor 620 of the PXU 160 processes the received image data from the imaging unit 110 to enumerate, extract and geolocate objects in each camera plane. The object extractor 620 can include multiple extraction units 622, 624, etc. that perform multi-thread object extraction algorithm using quantum resonance interferometry (QRI).

The data representing the extracted objects of interest are processed by the data analyzer unit 630. The data analyzer unit 630 can include a OFOV co-registration unit 632, a memory encoder 634 and a memory index generator 636. The OFOV co-registration unit 632 can identify the overlapping regions in the FOV and co-register the objects of interest in the OFOV. The memory encoder 634 connected to the OFOV co-registration unit 634 can reduce the co-registered objects in the OFOV to an invariant graph or theoretical memory maps using PSRI transformation. Geometric objects of interest (with rigid and fixed edges) are encoded offline or upfront using a training procedure, to a position—Shift-Rotation invariant graph representation using the following set of transformations.

1. Geometric objects of interest are placed at a fixed distance from the imager focal plane.

2. Each geometric object if presented in a total of 6 views or 12 view (if the geometric object has different sides, top and bottom geometries). Three of the presentation views include the three side views in the classical Euclidean frame (x-y-z orthogonal axis). A top, front, and side view would correspond to the three presentation frames. If however the sides are completely different then view include all sides, top and bottom. It is assumed that MPEX electronic eye and target of interest can occupy any relative reference position in the 3-D frame of reference or operations in free space.

3. Additional images are taken in object positions that correspond to classical roll, pitch and yaw angles of rotation.

A rotation of at least 10 degrees is sufficient to create a perspective view of the object for imaging to develop a memory model.

4. These 9 images are denoted as "base" or "canonical" views of the object of interest or target. Any position or exposed perspective of the object in the real-world frame 3-D frame of reference can be described using a combination of "n" rotations and "m" transformations around a (☐ degree) roll, (☐ degree) pitch, and (☐ degree) yaw around some real axis of symmetry of the object or a hypothetical axis if the object is non-symmetrical. In additions these view include target or object translations in x, y and z planes with respect to the MPEX Electronic Eye position.

5. Furthermore, the object and MPEX imager can be separated over a continuum that can range from some fraction of imager lens focal length to some multiple. This represents the "relative shift" continuum between object of interest and MPEX in the real-world.

6. The relative position of target of object of interest can be expressed as a combination of rotation, transformation and shift distance using axes of symmetry as defined by the MPEX Electronic Eye axes of the symmetry and the position of MPEX Electronic Eye. For offline PSRI memory model development of the target of interest the position of MPEX focal plane is assumed to be known and fixed. Also, the rotational axes of symmetry for MPEX Electronic Eye are known and considered fixed.

7. Each target image (in 6 or 9 canonical perspectives) is reduced to a collection of "geometric features". (e.g. corners, rigid edges longer than some preset length). These geometric features are reduced to a (x,y) coordinate location in feature space. For example an edge is represented by its centroid coordinate.

8. Each target is reduced and represented by a collection of features.

9. A center of mass (expressed in terms of 2-D Cartesian coordinates in the pixel space), for the object represented by features is computed for each canonical perspective image.

10. The Euclidean distance of each feature (expressed as a coordinate point) can now be computed from the center of mass.

11. The entire object can now be represented as a distribution of features based on their Euclidean distance from the "image" center of mass in pixel space. The distance range between the center of mass and farthest feature point of the image perspective can be used as a basis for binning to derive the feature distribution as is done in classical histogram computations.

12. The feature graph is used as a basis for deriving PSRI invariant transformations.

The memory index generator 636 can encode the invariance from the reduced invariant graph as a spectral signature, and encode the encoded spectral signature as a memory index to visual template and identification. The generated memory index can be reduced to a memory pointer such as a hash key.

The correlator 640 can include a hyperfast subgraph-isomorphic correlator to correlate incoming images with the stored PSRI model for each object in each imaging perspective.

Figure 7:
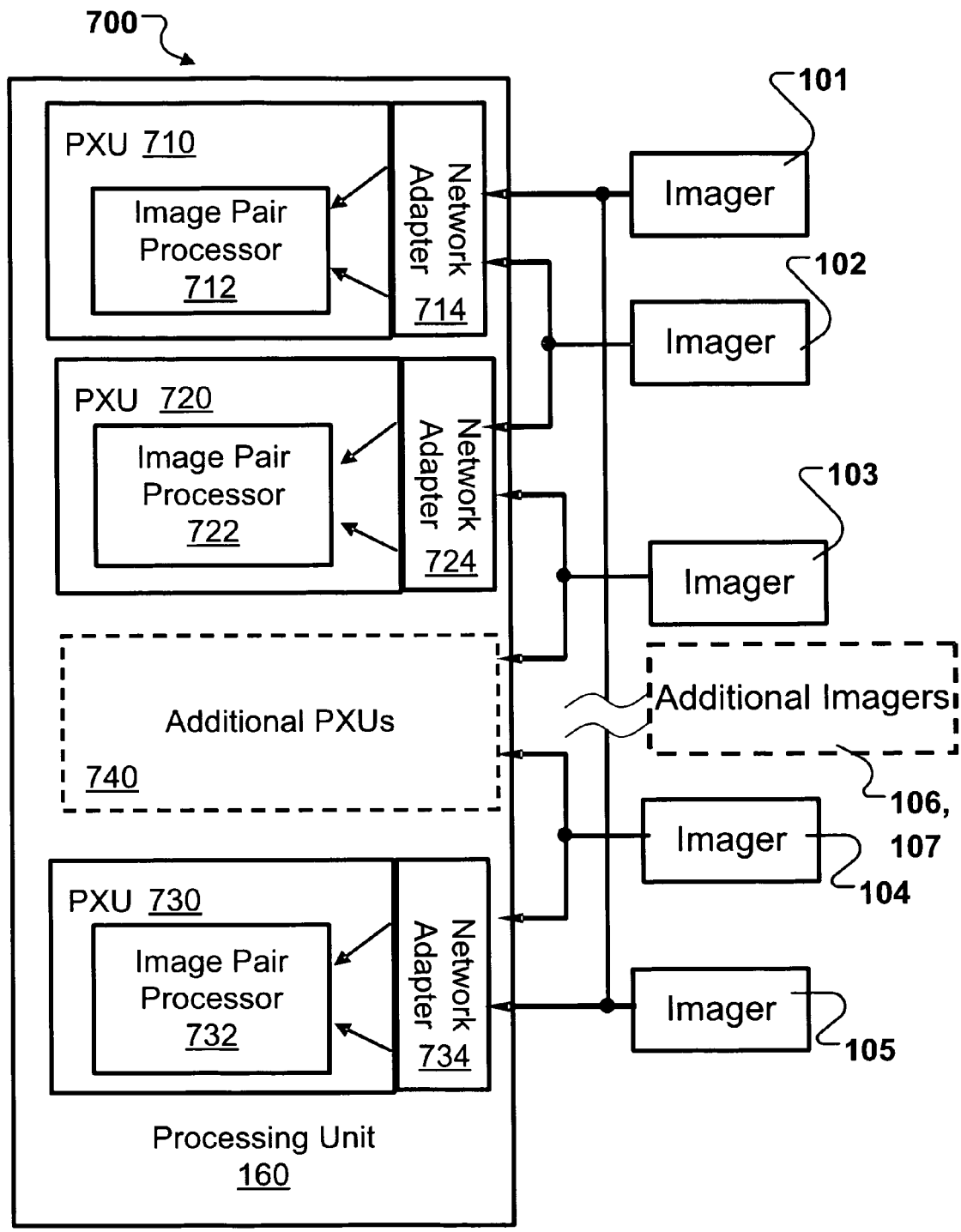
FIG. 7 is a block diagram illustrating an example MPEX product packaging.

FIG. 7 is a block diagram illustrating an example MPEX product packaging 700. The PXU modular architecture is scalable with respect to the number of imagers and the PXUs used. In addition, imagers are interchangeable with other detectors. For example thermal, video, UWB and/or X-ray imagers can be used. Also, MPEX can be constructed using multiple images of the same type or by mixing and matching different imagers. The example MPEX product packaging 700 includes a processing unit 160 connected to an imaging unit 110. The processing unit 160 includes one or more PXUs 710, 720, 730, etc. Each PXU is connected to two or more imagers 101, 102, 103, 104, 105, 106, 107, etc. and processes the image data captured from the connected imagers 101, 102, 103, 104, 105, 106, 107, etc. Each PXU includes an communication module 714, 724, or 734, such as a network adaptor to perform data connections with the imagers. The communication module forwards the image data from the connected imagers 101, 102, 103, 104, 105, 106, 107, etc. to an image pair processor 712, 722, or 734 to process the received image data using MPEX processing as described in this specification.

The MPEX modular architecture can operate in two phases: (1) memory development phase and (2) operational phase. In operations, the memory development phase includes a process for encoding the targets or objects of interest using the protocol described above. During the operational phase, incoming sensor data is processed to locate, recognize and characterize targets or features of interest.

Figure 8:
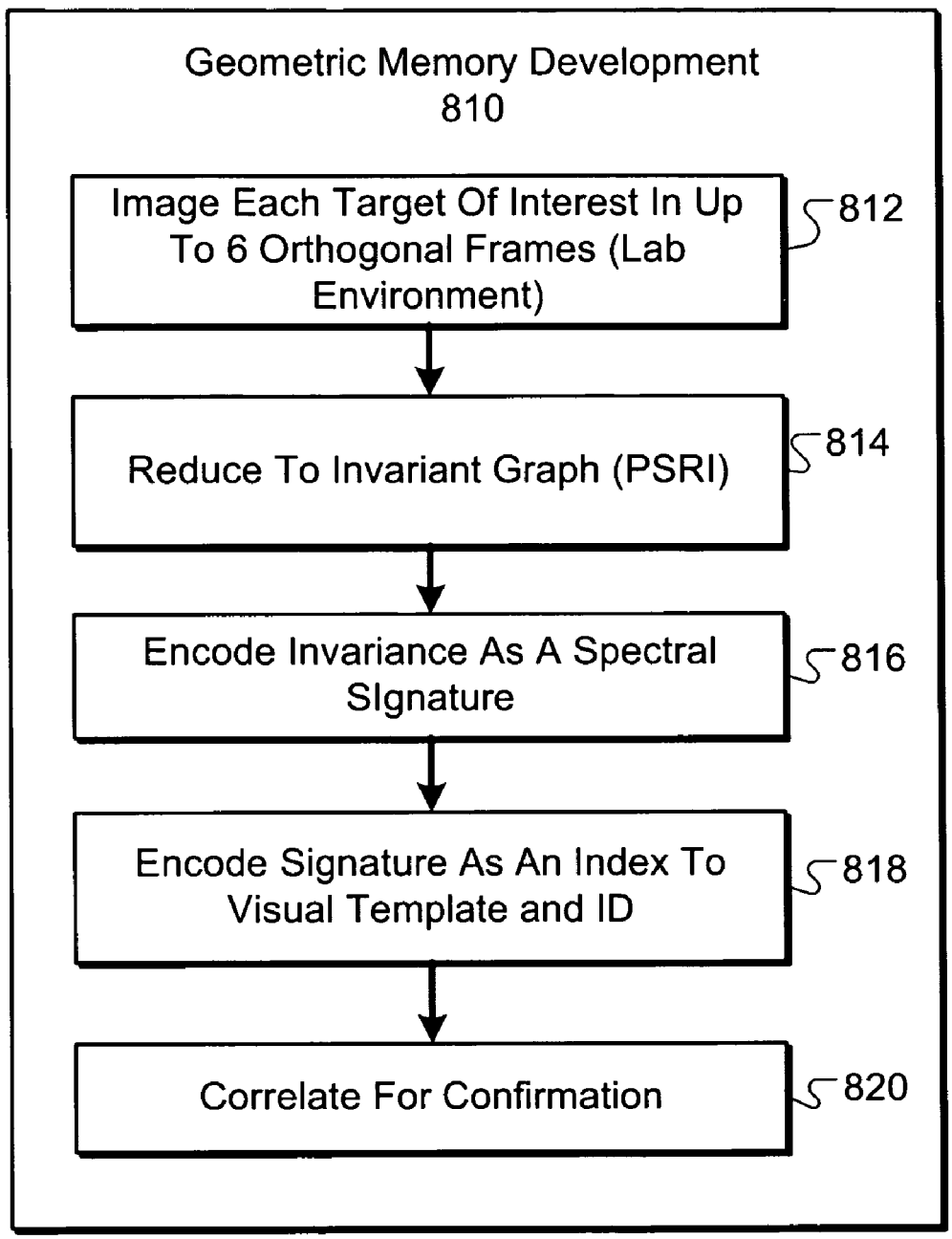
FIG. 8 illustrates an a process for performing an example geometric memory development.

FIG. 8 illustrates a process 810 for performing an example geometric memory development. Each target of interest is imaged 812 in up to 6 orthogonal frames in a lab environment. Each imaged perspective of the target of interest (in the 9 canonical planes) is reduced 814 to an invariant graph using PSRI invariance from the reduced invariant graph is encoded 816 as a spectral signature using methods described copending U.S. patent application Ser. No. 11/018,788, which is corporate by reference. The encoded spectral signature is encoded 818 as an index to visual template and identification are correlated 820 for match confirmation.

Briefly, spectral transformation is a technique for characterizing digitized intensity output patterns from microarrays. This technique yields improved sensitivity with reduced false positives and false negatives. Current microarray methods are overly sensitive to the detection of a visible distinction between pixels associated with probes and pixels associated with background. In one aspect, pixels associated with an object of interest are extracted and the extracted pixels are transformed from an intensity representation to a spectral representation. In some implementations, the extraction is based on a tessellated logarithmic spiral extraction that may yield a pixel core with a sampling of both foreground and background pixels. This core may then be computationally rescaled by 10×-10,000×, to enhance spatial resolution. Once the extracted pixels are represented in the spectral regime, convolution with resolution-enhancement kernels may be used to accentuate morphological features capturing platform specific phenomenology.

Figure 9:
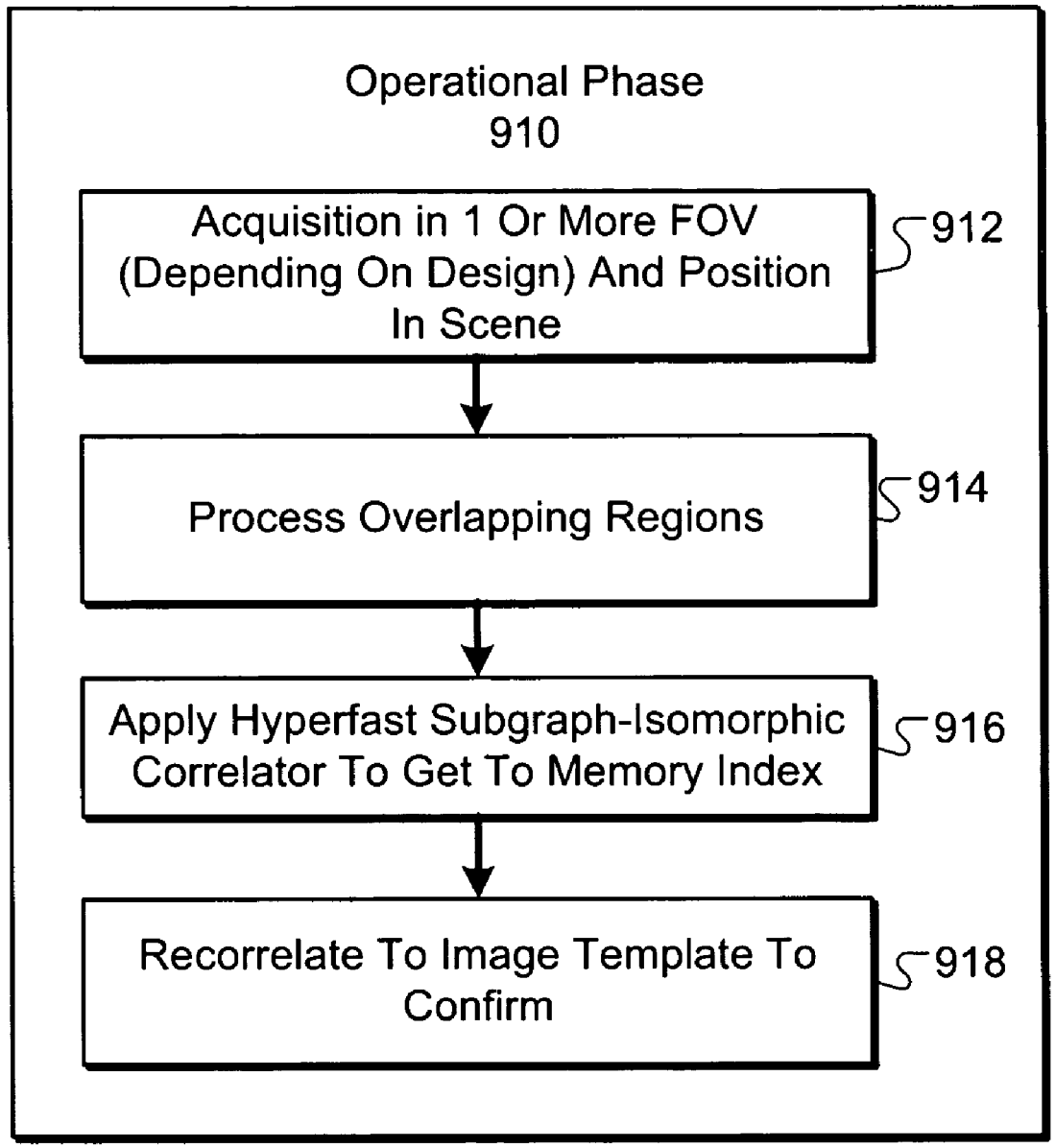
FIG. 9 shows a process for performing an example operational phase.

FIG. 9 shows a process 910 for performing an example operational phase. The systems 100, 600, 700 perform image acquisition 912 in one or more overlapping FOV (depending on the design of the system) and position in a scene. Each pair of imagers represent one field of view. The overlapping regions in the FOV are identified and processed 914. Hyperfast subgraph-isomorphic correlator is applied 916 to obtain the memory index. The transformed incoming image is recorrelated 918 to the image template to confirm target match.

Figure 10:
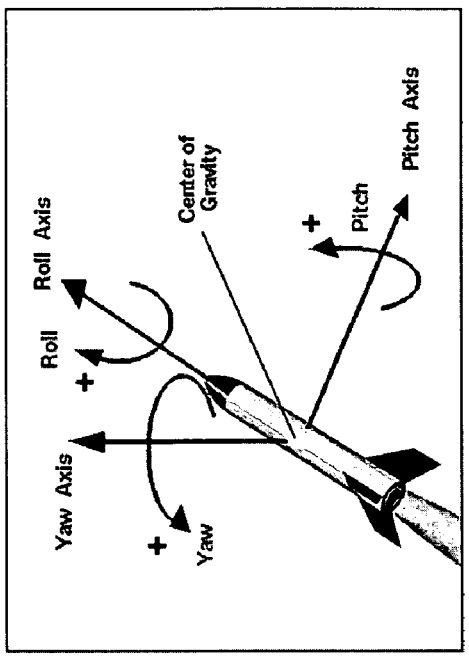
FIG. 10 illustrates an example geometric memory development.
Figure 10:
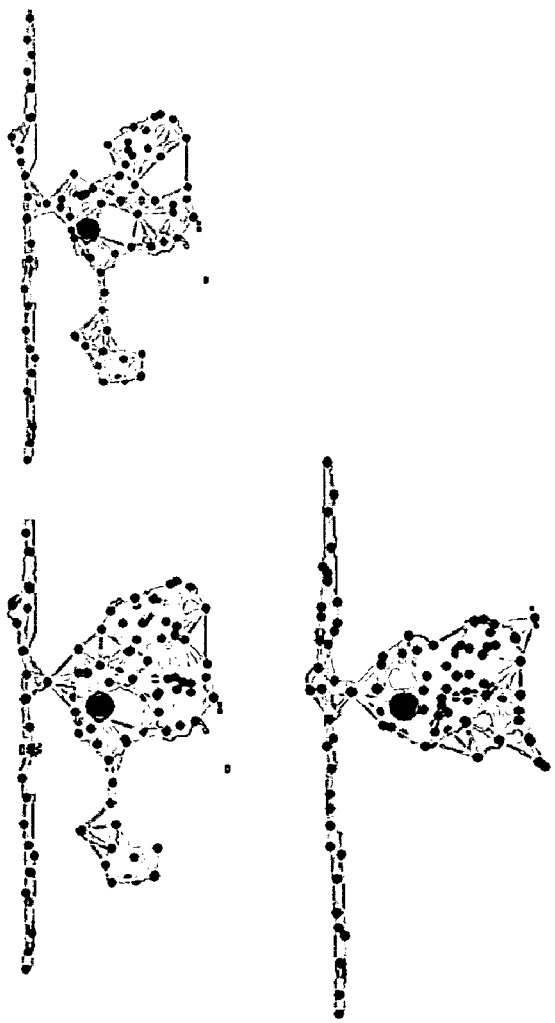

FIG. 10 illustrates an example geometric memory development 810. Dotted lines in the Figure represent notional edges connecting object features (e.g. corners, centroid of edges.)

Figure 11:
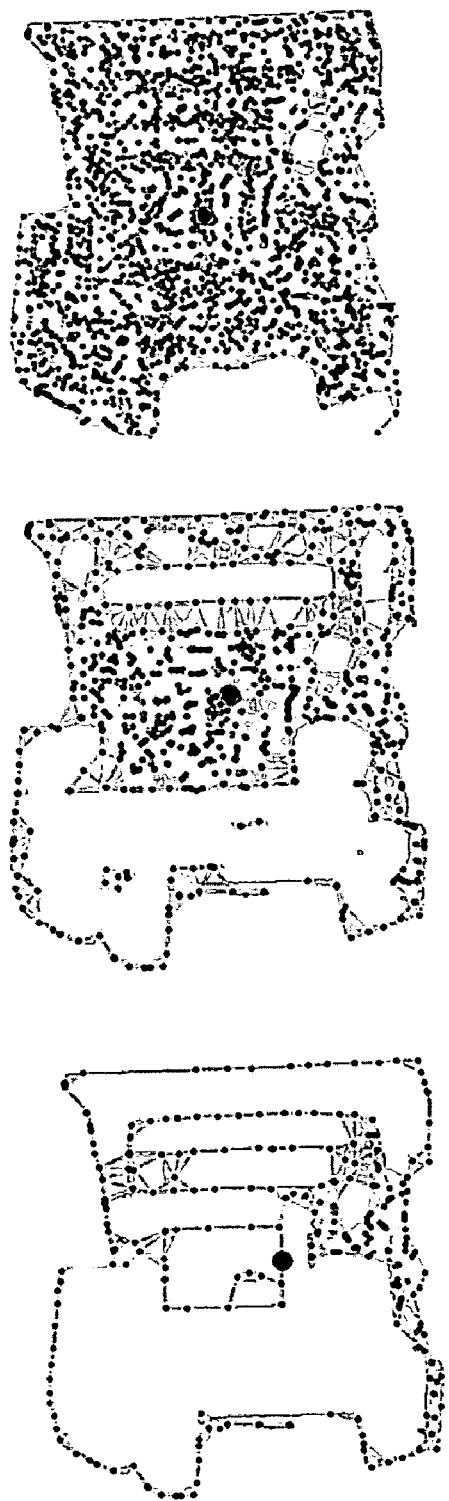
FIG. 11 shows an example.

Geometric memory development 810 can enhance the robustness of data representing distance, lighting, angular positioning variations, etc. In addition, robustness to the camera & optics variability can be provided. Further, more sophisticated template encoding for geometric memory and target representation can be implemented. FIG. 11 shows another example of geometric memory development.

Figure 12:
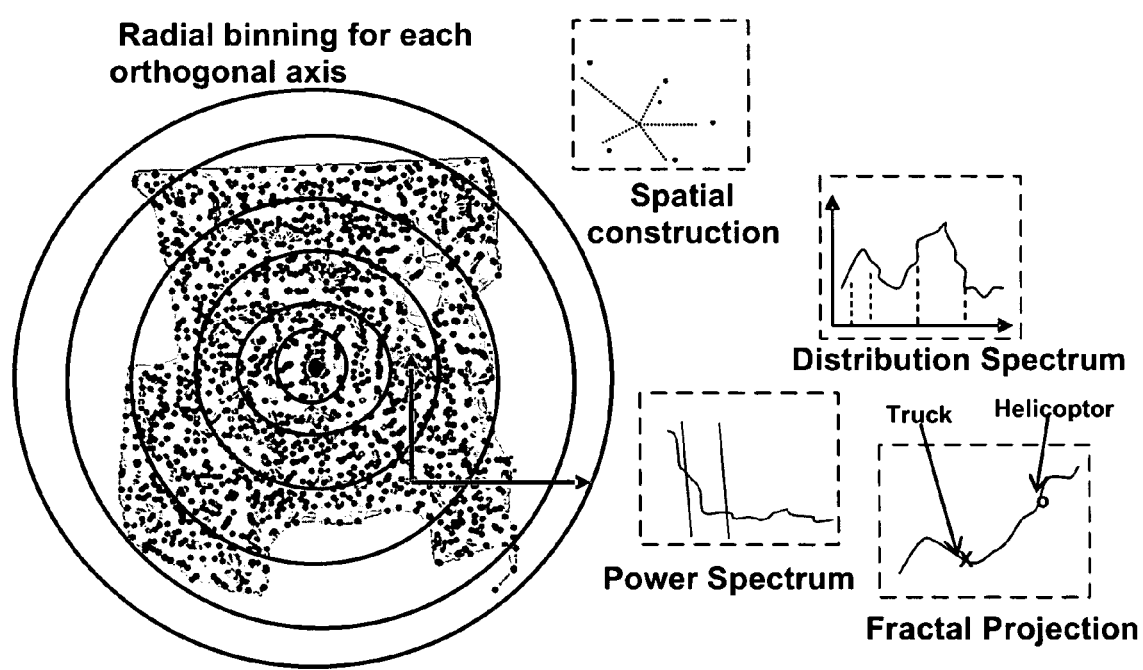
FIG. 12 shows an example radial binning for each orthogonal axis.

FIG. 12 shows an example radial binning for each orthogonal axis. The captured images are processed to obtain spatial construction, distributed spectrum, power spectrum and fractal projection. Methods for performing fractal transformation is described in U.S. Pat. No. 7,047,136 and U.S. Pat. No. 6,136,541, which are incorporated by reference in the present specification.

Briefly, spectral transformation as described in U.S. Pat. No. 7,047,136 includes techniques for determining the effectiveness of a therapy, such as an anti-viral therapy, by analyzing biochip output patterns generated from biological samples taken at different sampling times from a patient undergoing the therapy. A viral diffusion curve associated with a therapy of interest is generated and each of the output patterns representative of hybridization activity is then mapped to coordinates on the viral diffusion curve using fractal filtering. A degree of convergence between the mapped coordinates on the viral diffusion curve is determined. Then, a determination is made as to whether the therapy of interest has been effective based upon the degree of convergence.

The viral diffusion curve is spatially parameterized such that samples map to coordinates near the curve maxima, if the viral load is increasing (i.e., therapy or dosage is ineffective). In this manner, any correlation between rate and extent of convergence across different patient samples is exploited to provide a quantitative and qualitative estimate of therapy effectiveness.

Also, the biological sample is a DNA sample. The output pattern of the biochip is quantized as a dot spectrogram. The viral diffusion curve is generated by inputting parameters representative of viral load studies for the therapy of interest, generating a preliminary viral diffusion curve based upon the viral load studies; and then calibrating a degree of directional causality in the preliminary viral diffusion curve to yield the viral diffusion curve. The parameters representative of the viral load studies include one or more of baseline viral load (BVL) set point measurements at which detection is achieved, BVL at which therapy is recommended and viral load markers at which dosage therapy is recommended. The preliminary viral diffusion curve is generated by selecting a canonical equation representative of the viral diffusion curve, determining expectation and mean response parameters for use in parameterizing the equation selected to represent the viral diffusion curve and parameterizing the equation selected to represent the viral diffusion curve to yield the preliminary viral diffusion curve.

In addition, each dot spectrogram is mapped to the viral diffusion curve using fractal filtering by generating a partitioned iterated fractal system IFS model representative of the dot spectrogram, determining affine parameters for IFS model, and then mapping the dot spectrogram onto the viral diffusion curve using the IFS. Before the dot spectrograms is mapped to the viral diffusion curve, the dot spectrograms are interferometrically enhanced. After the mapping, any uncertainty in the mapped coordinates is compensated for using non-linear information filtering.

In another aspect, the viral load within a biological sample is determined by analyzing an output pattern of a biochip to which the sample is applied. A viral diffusion curve associated with a therapy of interest is generated and then calibrated using at least two viral load measurements. Then the output pattern for the sample is mapped to coordinates on the calibrated viral diffusion curve using fractal filtering. The viral load is determined from the calibrated viral diffusion curve by interpreting the coordinates of the viral diffusion curve.

Methods for performing spectral transformations in reducing the distribution of feature points to a spectral vector construction is described in co-pending U.S. patent application Ser. No. 11/018,788, which is incorporated by reference in the present specification.

The computational process for the MPEX systems 100, 600, 700 can be implemented to use an algorithmic approach to address the various technical issues. In addition, simple low-power computational operations in conjunction with fast memory can be exploited. Architectural overlay can be developed for an in-line simulation engine to combine advanced perceptual capability with adaptive control. Further, sensor interoperability can be implemented to use different modalities, such as visible, infrared, x-ray, passive millimeter wave, microwave, THz, UWB, etc.

The MPEX systems 100, 600, 700 can robustly characterize one or more desired targets or objects of interest and their associated ranges when the targets are introduced in the FOV. Also, the software and or firmware processing unit 160 can process real-time video rates from the video data obtained from the IP cameras. In addition, the processing unit 160 can process the video data in real time to exploit pixel overlaps in the FOV to detect correlation and depth of the targets. Further, the MPEX systems 100, 600, 700 can provide an end-to-end processing time in the rage of 200 ms-400 ms performed all in the IP-enabled cameras and imagers and software for processing at the network edge. The MPEX systems 100, 600, 700 can be implemented to have a small code footprint for onboard, autonomous deployments.

In operation, the MPEX systems 100, 600, 700 can use MPEX processing based on photogrammetric or optical correlation techniques to remedy real-world problems and scaling issues. MPEX processing can rapidly and automatically remedy the "correspondence problem" (CP) or pixel registration between images in the presence of arbitrary overlap, parallax, and angular distortion. MPEX processing can also remedy the CP for each image pair, imaging arbitrary scenes, in the presence of clutter and/or environmentally generated distortion (e.g., rain, fog). In addition, the multi-parallax processing can remedy the CP for mobile platforms in the presence of motion-induced jitter. To remedy the CP, the MPEX systems 100, 600, 700 can register, correlate and operate on object basis and not pixel basis.

In classical image processing algorithms, the overlapping field of view (OFOV) is first normalized between image pairs at considerable computational cost. The MPEX systems 100, 600, 700 can implement algorithms to produce accurate results despite variations in shape, size, orientation, etc. of OFOV and optimize processing to the overlapping regions. The algorithms used can include a PSRI representation that is also clutter resistant.

The MPEX systems 100, 600, 700 can provide a generalized visual perception capability and can incorporate multiple imaging modalities, including: (1) Visible imaging; (2) Infrared imaging; (3) X-Ray imaging; (4) Passive/Active microwave imaging; and (5) Terahertz (THz) and UltraWideBand (UWB) imaging.

The MPEX systems 100, 600, 700 can provide target acquisition and tracking by utilizing the convergence of various principles underlying biomimetic construction. Example principles of biomimetic construction can include: (a) exploitation of multiple optical parallaxes to provide simultaneous multiple target tracking and precision ranging; (b) position, shift and rotation invariant (PSRI) automatic target recognition (ATR) based on spatial correlations between acquired real-time image scenes and encoded, reprogrammable template libraries of reference targets of interest; and (c) registration and adaptive referencing of dynamic target and MPEX Electronic Eye frame of reference.

The MPEX systems 100, 600, 700 are constructed using biomimetic design principles to exploit multi-parallax construction and information processing architecture. MPEX can meet requirements envisioned for the next generation of low-power visual seekers for various applications including (1) autonomous missile interceptors, (2) low altitude surveillance unarmed vehicles (UAVs) and microUAVs (MAVs), (3) border surveillance, (4) planetary rovers, (5) high speed manufacturing, and (6) subterranean mining, search and rescue crawlers and robotic vehicles (SRV) designed to operate in confined cavities.

In these and other applications, the MPEX systems 100, 600, 700 can be implemented as static and/or mobile platforms and can recognize both stationary and dynamic targets. Example stationary or fixed platforms can include (1) tower surveillance at border & infrastructure and urban locations, (2) public safety platforms (e.g., inside train wagons), and (3) automated assembly & manufacturing platforms. Examples of mobile or dynamic platforms can include (1) UAV/UCAV solo/formation flying, (2) missile seekers, (3) rover navigation, and (4) airborne/helicopter search and Rescue.

The MPEX systems 100, 600, 700 can be implemented to perceive and characterize one or more "geometric objects of interest" in cluttered environments. Implementations of MPEX can include 1) memory-centric geometric situational awareness; (2) optimal geometric representation and memory model for terrain, target and threat; (3) real-time terrain, target and threat perception based on arbitrary parallax OFOV from multiple video streams; and (4) search for target without searching by combining pre-attentive & focal attentive vision.

In addition, implementations of the MPEX systems 100, 600, 700 can include (5) real-time video imagery fusion to resolve and support parallax combinatorics; (6) multiple overlapping stereo images; (7) ultra-fast correlation of incoming fused stereo video with onboard memory in a position-shift-rotation invariant (PSRI) manner; (8) ultra-fast retrieval from on-board ultra-dense memories (e.g., $10^4$ to $10^7$ image sequences) and (9) memory chaining to support non-monotonic reasoning.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A system comprising:
    an imaging unit including multiple image capture devices spaced from one another to form an array to provide overlapping fields-of-view and to capture multiple overlapping stereo images of a scene; and
    a processing unit connected to the imaging unit to receive and process data representing the captured multiple overlapping stereo images from the imaging unit to characterize one or more objects of interest in the scene, the processing unit configured to process the data with a multi-thread object extraction algorithm that uses quantum resonance interferometry (QRI).

2. The system of claim 1, wherein the imaging unit is configured to capture images of each object of interest in multiple orthogonal frames.

3. The system of claim 1, wherein the processing unit is configured to process the data by processing overlapping regions in the overlapping stereo images.

4. The system of claim 1, wherein the processing unit is configured to process the data on object of interest basis instead of pixel basis.

5. The system of claim 1, wherein the imaging unit includes a combination of low and high resolution image capture devices.

6. The system of claim 1, wherein the imaging unit includes multiple image capture devices having different focal lengths.

7. A system comprising:
    an imaging unit including multiple image capture devices spaced from one another to form an array to provide overlapping fields-of-view and to capture multiple overlapping stereo images of a scene; and
    a processing unit connected to the imaging unit to receive and process data representing the captured multiple overlapping stereo images from the imaging unit to characterize one or more objects of interest in the scene, wherein the processing unit is configured to correlate the overlapping stereo images in a position-shift-rotation invariant manner.

8. The system of claim 7, wherein the processing unit is configured to correlate the overlapping stereo images in a position-shift-rotation invariant manner that is clutter resistant.

9. A method comprising:
    receiving captured images of a scene in one or more overlapping fields of view;
    processing overlapping regions of the captured images with a multi-thread object extraction algorithm that uses quantum resonance interferometry (QRI); and
    based on the processing, characterizing, with a computer comprising a processor and a memory device, one or more objects of interest in the scene.

10. The method of claim 9, further comprising capturing the images of the one or more objects of interest in multiple orthogonal frames.

11. The method of claim 9, further comprising processing the captured images on object of interest basis instead of pixel basis.

12. A method comprising:
    receiving captured images of a scene in one or more overlapping fields of view;
    processing overlapping regions of the captured images;
    based on the processing, characterizing, with a computer comprising a processor and a memory device, one or more objects of interest in the scene; and
    performing subgraph-isomorphic correlation with the captured images.

13. A method comprising:
    receiving captured images of a scene in one or more overlapping fields of view;
    processing overlapping regions of the captured images;
    based on the processing, characterizing, with a computer comprising a processor and a memory device, one or more objects of interest in the scene; and
    performing correlation of the captured images in a position-shift-rotation invariant manner.

14. The method of claim 13, further comprising performing correlation of the captured images in a position-shift-rotation invariant manner that is clutter resistant.

15. A non-transitory computer readable medium having a program stored thereon, operable to cause a data processing apparatus to perform operations comprising:

receiving captured images of a scene in one or more overlapping fields of view;

processing overlapping regions of the captured images with a multi-thread object extraction algorithm that uses quantum resonance interferometry (QRI); and based on the processing, characterizing one or more objects of interest in the scene.

16. The non-transitory computer readable medium of claim 15, further operable to cause a data processing apparatus to capture the images of the one or more objects of interest in multiple orthogonal frames.

17. The non-transitory computer readable medium of claim 15, further operable to cause a data processing apparatus to process the captured images on object of interest basis instead of pixel basis.

18. A non-transitory computer readable medium having a program stored thereon, operable to cause a data processing apparatus to perform operations comprising:

receiving captured images of a scene in one or more overlapping fields of view;

processing overlapping regions of the captured images;

based on the processing, characterizing one or more objects of interest in the scene; and performing subgraph-isomorphic correlation with the captured images.

19. A non-transitory computer readable medium having a program stored thereon, operable to cause a data processing apparatus to perform operations comprising:

receiving captured images of a scene in one or more overlapping fields of view;

processing overlapping regions of the captured images;

based on the processing, characterizing one or more objects of interest in the scene; and performing correlation of the captured images in a position-shift-rotation invariant manner.

20. The non-transitory computer readable medium of claim 19, further operable to cause a data processing apparatus to perform correlation of the captured images in a position-shift-rotation invariant manner that is clutter resistant.

* * * * *